(12) United States Patent
Van Den Bossche

(10) Patent No.: US 8,473,790 B2
(45) Date of Patent: Jun. 25, 2013

(54) METHOD FOR CORRECTING PREDICTION ERRORS OF SIGNAL VALUES WITH TIME VARIATION SUBJECTED TO INTERFERENCE BY VARIOUS UNCONTROLLABLE SYSTEMATIC EFFECTS

(75) Inventor: Mathias Van Den Bossche, Goyrans (FR)

(73) Assignee: Thales, Neuilly sur Seine (FR)

(*) Notice: Subject to any disclaimer, the term of this patent is extended or adjusted under 35 U.S.C. 154(b) by 175 days.

(21) Appl. No.: 13/126,280

(22) PCT Filed: Oct. 27, 2009

(86) PCT No.: PCT/EP2009/064154
§ 371 (c)(1),
(2), (4) Date: Jul. 7, 2011

(87) PCT Pub. No.: WO2010/049422
PCT Pub. Date: May 6, 2010

(65) Prior Publication Data
US 2011/0258494 A1    Oct. 20, 2011

(30) Foreign Application Priority Data
Oct. 28, 2008  (FR) .................................... 08 05982

(51) Int. Cl.
*G06K 5/04*      (2006.01)
*G06F 11/00*     (2006.01)
*G11B 5/00*      (2006.01)

(52) U.S. Cl.
USPC ............................ 714/700; 714/815; 701/478

(58) Field of Classification Search
USPC .................. 714/700, 815, 811, 814, 799, 55, 714/48; 701/468, 469, 473, 476, 478; 704/219, 704/211, 226; 342/357.21–357.22
See application file for complete search history.

(56) References Cited

U.S. PATENT DOCUMENTS

| | | | |
|---|---|---|---|
| 5,721,694 A * | 2/1998 | Graupe | 702/191 |
| 6,262,943 B1 | 7/2001 | Clarke | |
| 6,263,281 B1 | 7/2001 | Yamamoto et al. | |
| 6,683,563 B2 * | 1/2004 | Lee et al. | 342/357.395 |
| 8,022,870 B2 * | 9/2011 | Malaney | 342/357.74 |
| 2003/0062479 A1 | 4/2003 | Kametani et al. | |
| 2003/0191634 A1 | 10/2003 | Thomas | |

FOREIGN PATENT DOCUMENTS
EP   1 675 294 A1   6/2006

* cited by examiner

*Primary Examiner* — Christine Tu
(74) *Attorney, Agent, or Firm* — Baker Hostetler LLP

(57) ABSTRACT

A method for correcting the prediction of values of signal with time variation, in particular for navigation messages sent by the global satellite navigation systems, includes the following steps for the correction of the predictions of a parameter included in a received signal and varying in time: estimation of the prediction error based on a first batch of values estimated during a determined time period by comparing these values to the values previously predicted for the same determined time period, analysis of the predicted time-oriented series of prediction errors by a method for processing the signal and isolating the contributions of the systematic effects, and extrapolation of the behavior of the contributions of the systematic effects during the time period concerned and correction of the predictions using the duly extrapolated values.

4 Claims, 2 Drawing Sheets

METHOD FOR CORRECTING PREDICTION ERRORS OF SIGNAL VALUES WITH TIME VARIATION SUBJECTED TO INTERFERENCE BY VARIOUS UNCONTROLLABLE SYSTEMATIC EFFECTS

CROSS-REFERENCE TO RELATED APPLICATIONS

This application is a National Stage of International patent application PCT/EP2009/064154, filed on Oct. 27, 2009, which claims priority to foreign French patent application No. FR 0805982, filed on Oct. 28, 2008, the disclosures of which are incorporated by reference in their entirety.

FIELD OF THE INVENTION

The present invention relates to a method for correcting predictions of signal values with time variation disturbed by various uncontrollable systematic effects.

BACKGROUND

The navigation messages sent by the global satellite navigation systems (such as Galileo, GPS, etc.) with their added systems which increase their integrity (EGNOS, WAAS, etc.) also include orbit prediction information for these satellites and reference time information. Using these predictions, the users of these navigation services compute their estimated position based on pseudo-distance measurements.

Any error affecting these predictions results in an error on the value of the geographic position of the user determined in this way. In the case of services for which safety is a vital issue, an integrity monitoring segment is provided for monitoring the integrity of the users by checking the validity of the predictions, and broadcasting the integrity information (integrity indicators such as SISA/SISMA for Galileo or UDRE for EGNOS/WAAS, which is a European superlayer for the GPS system). The users take account of these indicators in order to estimate the risk that the error affecting the position indicated is greater than an alarm threshold. The standardization and the certification of these indicators and of the algorithms for implementing them are currently under way.

One of the main problems raised by the community of satellite navigation experts is that, with the current standards, the integrity of the measurements can be obtained only on the imperative mathematical condition that the distribution of the errors is not affected by systematic effects, in particular bias. If such is not the case, even if the errors of each satellite are individually controlled via an allowance level broadcast to the users, the resulting error at the user's level cannot be controlled.

Given that the bandwidth of the navigation data broadcast channels is strictly limited, it is impossible to broadcast more than one orbit and clock prediction error characterization parameter.

To resolve this problem, attempts have been made to artificially increase the integrity indicators so as to improve the allowance level of the distribution of the prediction errors. However, this artificial increase has a strong influence on the availability of the integrity service, because it leads to numerous false alarms. It was therefore necessary to improve the quality of the corrections of the orbit and clock data.

The limitations inherent in the quality of the predictions are not always clearly identified. Numerous factors may be the cause of this limitation. Such factors include, in particular:

the inaccuracy of the model of the Earth's gravitational field, the fact of neglecting the higher-order tidal effects or the multiple-body effects (for example, the other planets of the solar system), algorithms for extrapolating observations into predictions that are insufficiently tried and tested, instability of the onboard navigation signal generation hardware, inaccuracy of the modeling of the solar radiation pressure effect, inaccuracy of the satellite mass data, of the position of the satellite's center of gravity, etc., and other factors not currently identified.

Most of the factors cited above are either inherent to the limitations of the state of the art (the first four), or subject to parameter drifts throughout the life of the satellite (the last three). The current solutions that are implemented to reduce the impact of these factors are primarily the following:

improvement of the accuracy of the geophysical data, for example improvement of the quality of the models of the Earth's gravitational field or of the tides, improvement of the accuracy of the data relating to the current state of the satellite, improvement of the performance levels of the computation circuits in order to enable them to compute a larger quantity of data with greater accuracy for longer iterative processes, improvement of the stability of the onboard hardware (by thermal control, refinement of the electronic circuits, etc.).

All these known solutions present limitations, in particular:

the accuracy of the geophysical data can be improved only at a relatively slow pace, from analysis of the results of the scientific missions, the accuracy of the data relating to the equipment and to the components of the satellite is very limited because of the very limited possibilities for observing them after the satellite has been launched. For example, such is the case with parameters such as the optical reflectivity of the satellite following the inevitable degradation of its reflective outer coating which plays a predominant role in the solar radiation pressure effect, it is not possible to improve the computation performance levels more rapidly than it is possible to improve the performance levels of the integrated circuits, which may soon reach their maximum level when their miniaturization reaches the atomic scale.

SUMMARY OF THE INVENTION

The subject of the present invention is a method for correcting the prediction of values of signals with time variation disturbed by various uncontrollable systematic effects, a method that is not subject to the abovementioned limitations and which is easy to implement.

The method according to the invention is characterized in that it comprises the following steps for the correction of the predictions of a parameter included in a received signal and varying in time:

construction of the history of the prediction error based on a first batch of values estimated a posteriori during a determined time period, with sufficient accuracy (hereinafter called: 'restored values') by comparing these restored values to a batch of the values previously predicted for the same determined time period, analysis of the predicted time-oriented series of prediction errors by a method for processing the signal and isolating the contributions of the systematic effects, extrapolation to a new prediction time period of the behavior of the contributions of the systematic effects identified during the time period concerned ($E_1$) and correction of the predictions using the duly extrapolated values.

BRIEF DESCRIPTION OF THE DRAWINGS

The present invention will be better understood from reading the detailed description of an embodiment, taken as a nonlimiting example and illustrated by the appended drawing, in which.

DETAILED DESCRIPTION

Figure 1:
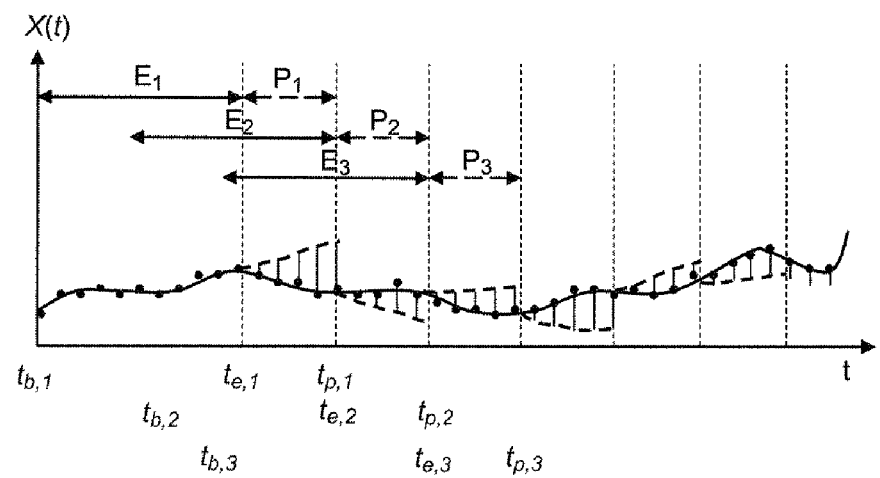
FIG. 1 is a timing diagram illustrating a simplified example of a batch of values obtained from measurements received and corresponding predicted values, according to the method of the invention.

The present invention is described hereinbelow with reference to the signals received from a radionavigation satellite, but obviously it is not limited to this single application, and it can be implemented in various applications in which signals are received that have to vary in time in an at least partially nonrandom manner and that can be disturbed by various systematic causes, and for which there is a history of the variation of these disturbing signals.

The present invention is based on the fact that an accurate orbit prediction algorithm works in batch processing mode (processing a large number of consecutive values contained within a time period or "arc"), its first step mandatorily being the accurate estimation of the position and orbit parameters of a satellite along an estimation arc related to the past. The estimated positions are then extrapolated for a prediction period in order to provide the predictions of the orbit parameters.

In the present case, the periods used for the determination of the predictions are always overlapping with one or more estimation arcs used in the last arcs of the prediction processing. Furthermore, the accuracy of the restored values is much higher than that of the predicted values. The comparison (namely their difference) of these two sorts of values says a lot about the defects of the predictive method. Known signal processing methods may be applied to the time-oriented series of these differences in order to extrapolate the behavior of the defects and correct them before they manage to produce their effects.

The method of the invention makes it possible to significantly reduce the potential systematic effects (of the type of those mentioned above) by virtue of their observation in the past, which leads to prediction error distributions that are much more appropriate to the needs of the integrity computation standards.

The method of the invention is implemented as follows.

Let $X(t)$ be any parameter, dependent on time, which may relate to the clock or to the orbit of a satellite. This parameter X may be either a point of the orbit of this satellite with $X=x$, y or z which are the spatial coordinates of X, or be defined by $X=\delta t$, that is to say the offset of the satellite's clock. The method of the invention comprises the following three main steps:

estimation of the prediction error,
analysis of the factors systematically affecting the prediction error,
correction of the predictions.

In detail, these steps are explained below. Firstly, the prediction error is estimated on the basis of two batches of prediction values.

A—First Batch of Prediction Values

The computation of the orbit of a satellite begins with a recording of measurements over an estimation arc $E_1=[t_{b,1}, t_{e,1}]$ which is relatively long (more often than not from a few days to a few weeks). This estimation arc is used to estimate the restored values as restored by the conventional computation circuits of the parameter X orbitography and synchronization instruments. Let $X_{r1}(t)$ be the function making it possible to obtain the restored values of this parameter during the time period $t \in E_1$. The details of the restoration method are unimportant in the context of the invention, and it is only necessary to have $X_{r1}(t)$ for the duration of the arc $E_1$. These restored values can, moreover, originate from a source that is different from the prediction computation circuit.

The restored values are linked to the estimation of certain parameters (orbit parameters, Earth's rotation parameters, satellite reflectivity model, etc.) that can be used to calculate the values of X at instants after $t_{e,1}$ ($t_{e,1}$ being the start of $P_1$). Let $X_{p1}(t)$ be values obtained in this way for:

$$t \in P_1 = [t_{e,1}, t_{p,1}]$$

in this expression, $t_{p,1}$ is the last prediction instant. These values of $X_{p1}(t)$ provide a first prediction of the parameter concerned. It will also be noted here that the details of how the prediction method is implemented is unimportant for the invention, and it is only necessary to have $X_{p1}(t)$ for the duration of the arc $P_1$.

Figure 2:
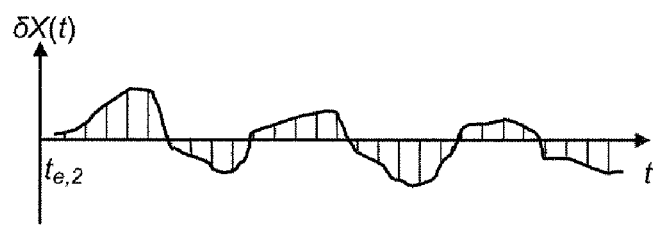
FIG. 2 is a timing diagram of the variation of the prediction errors concerning the predicted values of FIG. 1.

FIG. 1 shows the time variation of the estimation arcs ($E_1$, $E_2$, $E_3$, etc.) and of the corresponding prediction arcs ($P_1$, $P_2$, $P_3$, etc.). In this time diagram, the solid-line curve represents the restored values of X, whereas the broken-line curve segments relate to the predicted values of X. In FIG. 2, the points defining the solid-line curve correspond to the prediction errors of X obtained as the difference between the predicted values and the restored values of X at the same instants.

B—Second Batch of Prediction Values

For the next batch of orbit prediction values, the preceding operations are repeated for a second estimation arc $E_2=[t_{b,2}, t_{e,2}]$ with $t_{e,2} \leq t_{p,1}$. Furthermore, for most of the time: $t_{b,2} \leq t_{e,1}$ because the estimation arcs must be longer than the prediction arcs in order to obtain a good prediction quality, and then $P_1 \subset E_2$. Typically, but in a nonlimiting manner, in the present application, these estimation arcs may last from 1 hour to 48 hours. The measurements performed during the time period E2 make it possible to obtain a set of restored orbit or clock parameter values $X_{r,2}(t)$ corresponding to this period $E_2$ and being able to be propagated during the period $P2=[t_{e,2}, t_{p,2}]$ and obtain for this period orbit or clock predictions $X_{p,2}(t)$.

It should be noted that, for the time period $P_1$, two values of X are available because $P_1 \subset E_2$, namely $X_{p,1}(t)$ and $X_{r,2}(t)$ for $[t_{e,1}, t_{p,1}]$. Given that $X_{p,1}$ and $X_{r,2}$ are both approximations of the same orbit or clock parameter at the same instants, but with much better accuracy for $X_{r,2}$ than for $X_{p,1}$, an approximation of the prediction error is obtained for the time period P1 by:

$$\delta X(t) = X_{p,1}(t) - X_{r,2}(t) \text{ for } [t_{e,1}, t_{p,1}] \quad (1)$$

For the following prediction batches, in the same way as $\delta X(t)$ was established by comparing the prediction of X in the first batch to its restoration in the second, an estimation of the prediction error can be obtained for a batch n by comparing the prediction of $X_{p,n}(t)$ for this batch n to the restoration $X_{r,n+1}(t)$:

$$\delta X(t) = X_{p,n}(t) - X_{r,n+1}(t) \text{pour}[t_{e,n}, t_{p,n}] \quad (2)$$

This succession of estimation and prediction batches, and the prediction error estimation function $\delta X(t)$ have been represented in FIG. 2.

To sum up, the first main step of the method of the invention consists, for a batch n+1 of prediction values, in constructing a time-oriented series $\delta X(t)$ of prediction errors for each orbit or clock parameter X by comparing the restored values of the available batches with the predicted values of the preceding batch or batches.

Figure 3:
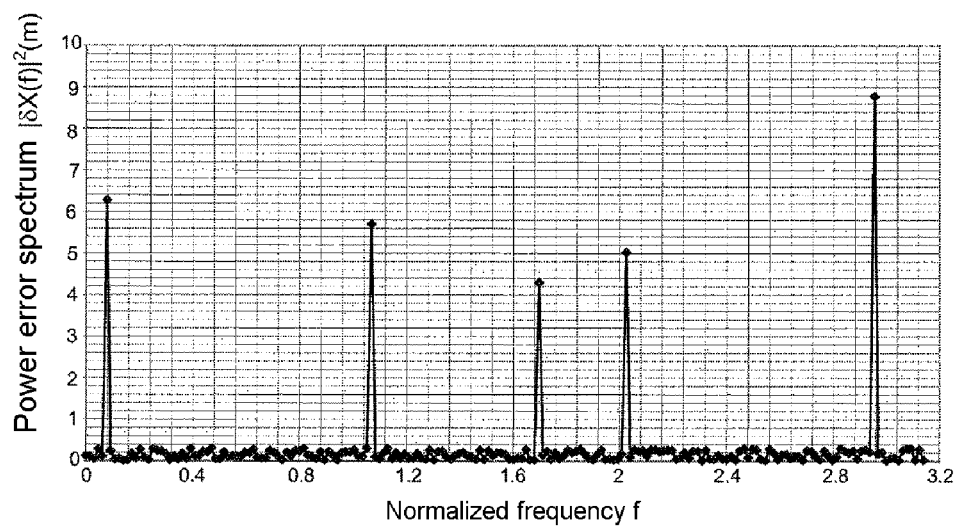
FIG. 3 is a diagram in the Fourier plane illustrating the systematic effects resulting in the prediction errors.

The next step of the method of the invention consists in isolating the systematic effects in the prediction error. The time-oriented series of prediction errors supplied by the function $\delta X(t)$, as represented in a simplified manner in FIG. 2, contain all the information relating to the prediction error. If this prediction error resulted only from the measurement errors, the curve representing $\delta X(t)$ would have a random variation. In most cases, this is not true, and, for example, a wavelet analysis or Fourier analysis of the time-oriented series of prediction errors, as represented in FIG. 3, reveals the characteristics of these time-oriented series of errors which clearly show that it is not a purely random variation. These characteristics correspond to systematic errors affecting the prediction process, and they are due to the presence of errors in the model used to predict the orbit itself or due to limitations of the prediction process.

FIG. 3 shows a diagram of an example of Fourier analysis giving the spectrum of the error on the power $|\delta X(f)|^2$ according to the normalized frequency f. In this example, the components of the spectrum whose value is significantly greater than the average value of the spectrum (the five narrow pulses that can be seen in the diagram) can be attributed to the systematic effects. These components correspond, in the case of the Fourier analysis, to the contributions $\delta X_{s,i}(t) = A(i) e^{j \omega i (t)}$ for different noteworthy values of $\omega(i)$ in the spectrum concerned.

To sum up, the second main step of the method of the invention consists in analyzing the time-oriented series of prediction errors using an appropriate signal processing method (Fourier analysis, wavelet analysis, or other signal processing methods) and isolating the contributions of the systematic effects $\delta X_{s,i}(t)$.

The next step consists in performing the prediction and the correction of the systematic prediction errors. Once the contributions $\delta X_{s,i}(t)$ of the systematic effects have been identified, it is relatively simple to extrapolate their behavior and time during the future prediction time period $P_{n+1}$. These contributions can therefore be used to correct the predictions in the prediction batch n+1 by subtracting the effects of the various contributions of the values of the function $\delta X(t)$.

To sum up, the third main step of the method of the invention consists in extrapolating the behavior of the contributions of the systematic effects $\delta X_{s,i}(t)$ in the prediction interval concerned and correcting the predictions with these contribution values.

It will be noted that the method of the invention can be implemented for corrected or uncorrected predictions. Also, the prediction arcs (corresponding to the time periods $P_1$, $P_2$, $P_3$ represented in FIG. 1) are advantageously mutually overlapping, but not necessarily.

The invention claimed is:

1. A method for correcting the prediction of values of signals with time variation disturbed by various uncontrollable systematic effects, comprising the following steps for the correction of the predictions of a parameter included in a received signal and varying in time:

constructing a history of the prediction error based on a first batch of values ($E_1$) estimated a posteriori during a determined time period, called restored values, by comparing these restored values to a batch of values previously predicted for the same determined time period, analyzing predicted time-oriented series of prediction errors by a method for processing the signal and isolating contributions of the systematic effects, and extrapolating a new prediction time period of the behavior of the contributions of the systematic effects identified during the time period concerned ($E_1$) and correction of the predictions using duly extrapolated values.

2. The method as claimed in claim 1, wherein the signal processing method is a Fourier or wavelet transform.

3. The method as claimed in claim 1, wherein the prediction time periods are mutually overlapping.

4. The method as claimed in claim 1, wherein the signals are received from a radio navigation satellite for the correction of the orbit prediction information for these satellites and their reference clock.

* * * * *

UNITED STATES PATENT AND TRADEMARK OFFICE
CERTIFICATE OF CORRECTION

PATENT NO. : 8,473,790 B2  Page 1 of 1
APPLICATION NO. : 13/126280
DATED : June 25, 2013
INVENTOR(S) : Mathias Van Den Bossche It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 246 days.

Signed and Sealed this
Eighth Day of September, 2015

Michelle K. Lee
*Director of the United States Patent and Trademark Office*